March 10, 1931. W. J. LOVETT 1,795,786
HATCH COVER FOR SHIPS
Filed Dec. 13, 1929 3 Sheets-Sheet 1
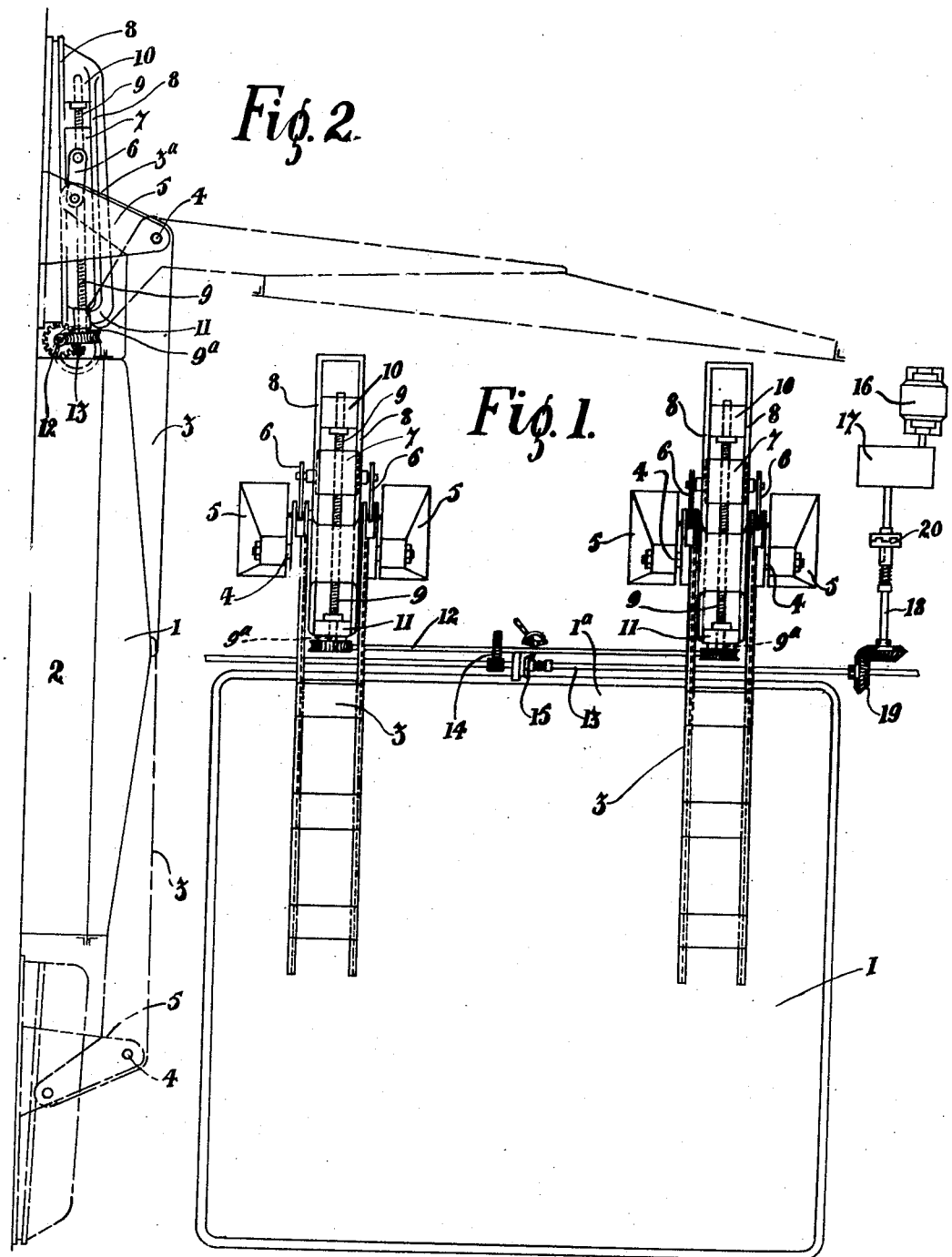
INVENTOR.
WILLIAM JAMES LOVETT.
BY
ATTORNEYS.

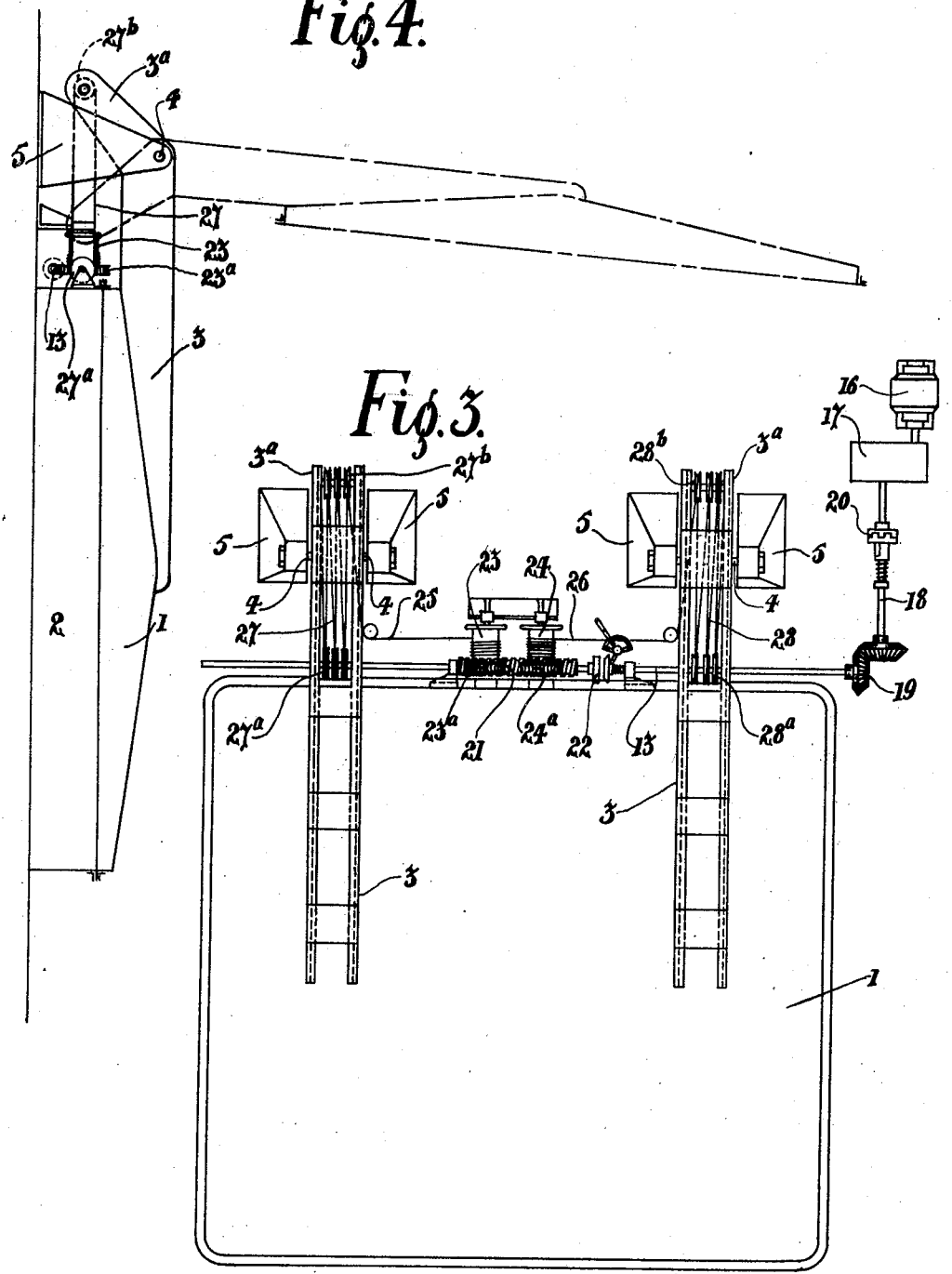

March 10, 1931.  W. J. LOVETT  1,795,786
HATCH COVER FOR SHIPS
Filed Dec. 13, 1929  3 Sheets-Sheet 3
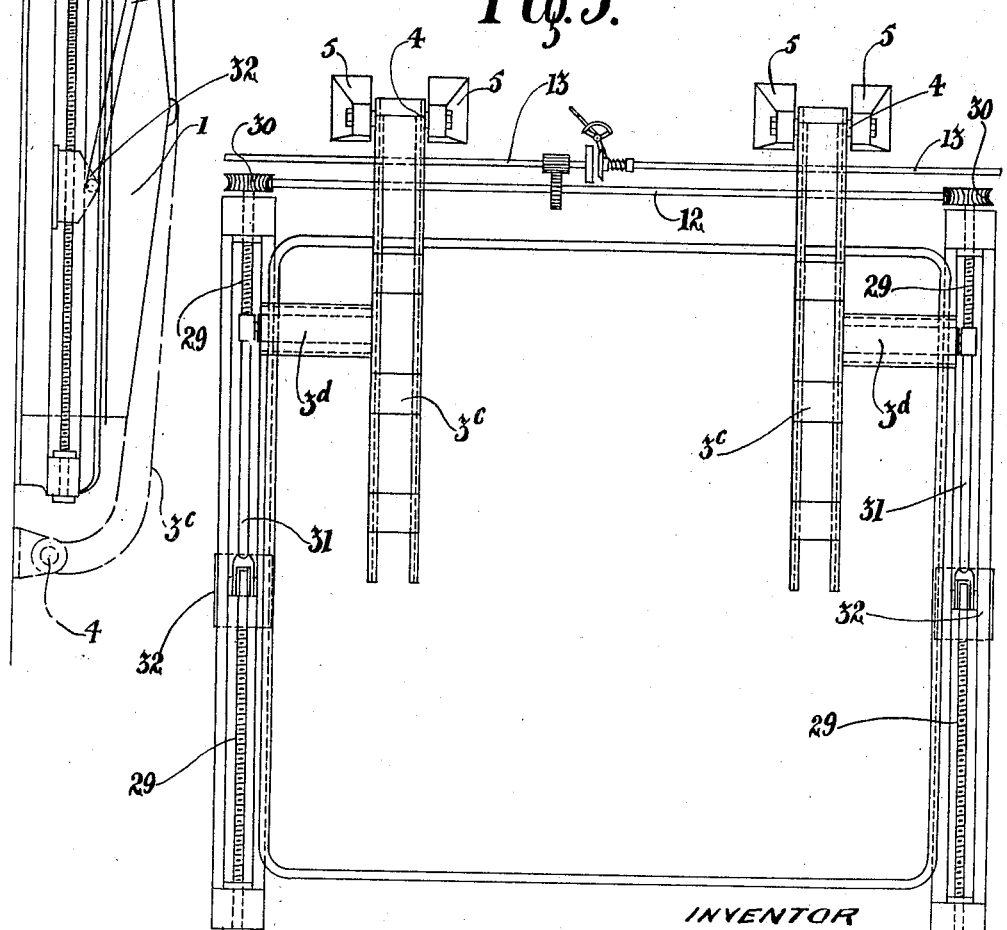
INVENTOR
William James Lovett.
By
Niedersheim Fairbanks.
ATTORNEYS.

Patented Mar. 10, 1931

1,795,786

UNITED STATES PATENT OFFICE

WILLIAM JAMES LOVETT, OF BANGOR, IRELAND

HATCH COVER FOR SHIPS

Application filed December 13, 1929, Serial No. 413,755, and in Great Britain February 7, 1929.

This invention relates to hatch covers for ships.

One object of the invention is to provide improved constructions of hatch covers which will enable the deck around a hatch to be comparatively free from obstructions. A further object is to provide means for raising a hatch cover without the use of deck supports or tackle extending above the cover.

Still further objects will appear throughout this specification.

The invention will now be described with reference to the accompanying drawings whereon examples are shown and hereinafter described, of operating means for hatch covers which, in accordance with the invention, give when the hatch cover is opened up, a hatch opening which is free from any deck obstruction along the side and/or end, or ends, except along the side or sides, or end or ends along which the hinging means are provided.

Fig. 1 is a plan view of a ship's hatch and lifting gear therefor in accordance with the invention.

Fig. 2 is an end elevation of the hatch and lifting gear.

Fig. 3 is a plan view of an alternative arrangement of lifting gear for the hatch cover.

Fig. 4 is an end elevation corresponding to Fig. 3.

Fig. 5 is a still further alternative arrangement of operating gear for the ship's hatch.

Fig. 6 is an end elevation corresponding to Fig. 5.

Referring to the drawings:—

In the examples shown at Figs. 1 and 2, the hatch cover 1, which extends right across the hatch opening 2, is supported along the side 1ª leaving the other three sides of the hatch 1 free from any deck or tackle obstruction along the three other sides. The hatch 1 is connected with bell crank levers 3 each of which is pivotally supported adjacent the angle thereof on spindles 4, supported by bearings 5. The end 3ª of each bell crank lever 3 is connected by links 6 with a feed nut 7, working in guides 8 and adapted to be moved by a screw 9 on which the nut 7 is mounted. The screw 9 in each case is supported in bearings 10 and 11 and the end 9ª of each screw 9 has a worm wheel thereon, driven by a worm on a countershaft 12 which obtains its drive from the main operating shaft 13 through gear 14. A clutch 15 is provided for disconnecting and connecting the countershaft 12 with the main transmission shaft 13 as required. The drive of the main transmission shaft 13 is, in the example shown, obtained from an electric motor 16 through a reduction gear box 17 and shaft 18 with bevel gear 19 completing the transmission from the motor 16 to the shaft 13. A disconnecting clutch 20 may be introduced on the shaft 18 if desired, and if more than one driving motor or engine is provided for driving the transmission shaft 13. The arrangement is such that by causing rotation of the motor shaft 16 in one direction the nut 7 is caused to transverse the screw 9 to raise the hatch cover 1 and by reversing the motor 16 the direction of travel of the nut 7 is reversed and the hatch cover 1 lowered. The raised position of the hatch cover 1 is shown in dotted lines in Fig. 2.

By providing duplicate operating gear as shown in dotted lines at the opposite side of the hatch as shown in Fig. 2 and by making provision for removing the pin or spindle 4 from one side and for inserting it in position at the other side of the hatch, it is possible to provide in this way for raising the hatch cover 1 from either side, as desired, so that the hatch cover 1 can be opened up in accordance with the side of the ship which is towards the quay. This feature is only shown in connection with this example of the invention, but it is to be understood that it can be applied to the other examples hereinafter described.

In the example shown at Figs. 3 and 4, the hatch cover operating gear, for raising and lowering the hatch cover 1, differs from that shown at Figs. 1 and 2, by the use of rope and pulley tackle in place of the screw and nut gear. In Figs. 3 and 4 the drive from the motor 16 is effected to the main transmission shaft 13 as before, and on this shaft is arranged a worm 21 which can be put into or out of action, as required, by means of a clutch 22. The worm 21 drives worm wheels 23$^a$ and 24$^a$ on the ends of the rope drums 23 and 24 respectively. The drums 23 and 24 are suitably supported and adapted to wind on or off wire ropes 25 and 26 leading to the rope tackle 27 and 28 respectively. The sheaves at the ends 27$^a$ and 28$^a$ are attached to and supported by the side of the hatch, whilst the sheaves at the ends 27$^b$ and 28$^b$ are carried by the ends 3$^a$ of the bell crank lever 3, the arrangement being such that the winding in of the ropes 25 and 26 will pull in the ends 3$^a$ and so raise the hatch cover; on paying out the rope the reverse action takes place. The full open position is shown in dotted lines at Fig. 4. If desired, one barrel or drum could replace the two drums 23 and 24, the single barrel or drum being formed to take the two ropes. The winding barrels or drums 23 and 24 or their equivalent, could be placed in any suitable position. Alternatively these drums or their equivalent might be dispensed with and the ropes 25 and 26 led to the ship winches. If desired, a wire, rope, or chain pennant may be fitted between the ends 3$^a$ of the levers 3 and the hoisting tackle.

In the example shown at Figs. 5 and 6, another modification or alternative construction of the hatch cover operating gear is shown. In this case nut and screw gear is employed, but instead of the bell crank lever arrangement shown in Figs. 1 and 2, the hatch cover is lifted by connecting the nut, working on the screw, with the hatch cover top through the medium of a connecting rod, or equivalent. In the example shown, the hatch cover 1 is operated by providing two screws 29, one at each side of the hatch way. These screws are respectively rotated by worm wheels 30, driven by worms on the countershaft 12 which is driven from the main line shaft 13 similarly to the drive shown at Figs. 1 and 2. The hatch cover 1 is hinged about the pins 4 carried by the bearings 5, the connection between the hatch cover 1 and the pins 4 being through the medium of the members 3$^c$. The members 3$^c$ have each a projecting arm 3$^d$ to which, in each case, one end of a link 31 is pivotally connected, the other ends of the links 31 being pivotally connected to nuts 32 working on the screws 29. The arrangement is such that by rotating the screws 29 in one or other direction, the nuts 32 will be caused to transverse the screws 29 to raise the hatch cover 1, and by reversing the direction of rotation of the screws 29, the hatch cover 1 will be lowered. By providing duplicate members 3$^c$ as shown in dotted lines at Fig. 6 and making provision for the withdrawal of the pins 4 at one side and for inserting them at the other side, and by reversing the links 31 so that they engage the members 3$^c$ at the opposite side of the hatch cover 1, it is possible to provide for raising the hatch cover 1 from the other side when required. The screws 29 as shown, are long enough to work the hatch cover hinged at either position. If only one hinged position of the hatch is desired, then the screws 29 would be shorter.

If desired, in some cases hydraulic, steam or air rams might be employed in place of the screw gears and tackle hereinbefore described. Any desired combination of the means shown or of the before mentioned means may be used for operating the hatch covers.

It will be understood that any number of hatch covers may be operated from the same main line shaft 13 and it will also be understood that when desired the hatch covers may be opened about an end, or ends i. e., from fore or aft ends of the hatch opening, or from both fore and aft ends of the hatch opening, if desired.

In some cases it may be advisable to provide for each hatch cover to open in two or more pieces in order to reduce the weight to be lifted by the operating gear, which would be provided with suitable reversing means.

The power and transmission means and the operating means, may be employed for part of one hatch cover, or for operating the whole hatch cover, and, if desired, the operating means may be adapted or arranged for simultaneously, or in any desired order, operating more than one hatch cover. Common operating means may be used for simultaneous operation of a number of hatch covers, or parts thereof.

I claim:—

1. The combination of a hatch cover, at least one lever member secured to said cover, means pivoting the or each lever member adjacent the edge of the hatch, reduction gearing means acting on the or each lever member to raise or lower said hatch cover about said pivoting means, and power means driving said reduction gearing means.

2. The combination of a hatch cover, at least one lever member secured to said cover, means pivoting the or each lever member adjacent the edge of the hatch, reduction gearing means acting on the or each lever member to raise or lower said hatch cover about said pivoting means, power means driving said reduction gearing means and a clutch between said power means and the or each lever member.

3. The combination of a hatch cover, at least one lever member secured to said cover, means pivoting the or each lever member adjacent the edge of the hatch, a feed nut actuated by a screw and acting on the or each lever member to raise or lower said hatch cover about said pivoting means.

4. The combination of a hatch cover, at least one lever member secured to said cover, means pivoting the or each lever member adjacent the edge of the hatch, a feed nut actuated by a screw and acting on the or each lever member to raise or lower said hatch cover about said pivoting means, the whole operative mechanism being located on one side of the hatch, whereby the hatch itself and the surroundings on the remaining sides thereof are clear of obstruction with the hatch cover in the raised position.

5. The combination of a hatch cover, at least one lever member secured to opposite sides of said cover, means detachable from each lever member and adapted to pivot the same adjacent to the edge of the hatch, power driven means adapted selectively to act on the or each lever member on one side of said cover to raise or lower the cover about the pivoting means on that side when the pivoting means on the opposite side are detached.

6. The combination of a hatch cover, two bell crank lever members secured to one side of said cover and projecting therefrom, a fixed bearing pivotally supporting each bell crank lever member adjacent the angle thereof, a feed nut linked to the end of each bell crank lever member, remote from its end secured to the hatch cover, and a power driven screw adapted to actuate each feed nut.

7. The combination of a hatch cover, two bell crank lever members secured to one side of said cover and projecting therefrom, a fixed bearing pivotally supporting each bell crank lever member adjacent the angle thereof, a feed nut linked to the end of each bell crank lever member, remote from its end secured to the hatch cover, a screw adapted to actuate each feed nut, power means adapted to drive the screws, and a clutch between said power means and each screw.

8. The combination of a hatch cover, two bell crank lever members secured to one side of said cover and projecting therefrom, a fixed bearing pivotally supporting each bell crank lever member adjacent the angle thereof, a feed nut linked to the end of each bell crank lever member remote from its end secured to the hatch cover, a screw adapted to actuate each feed nut, power means adapted to drive the screws, and a clutch and reduction gearing between said power means and each screw.

9. The combination of a hatch cover, two bell crank lever members secured to one side of said cover and projecting therefrom, a fixed bearing pivotally supporting each bell crank lever member adjacent the angle thereof, a feed nut linked to the end of each bell crank lever member remote from its end secured to the hatch cover, a screw adapted to actuate each feed nut, a main shaft, at least one electric motor driving said main shaft, a clutch in said main shaft, a countershaft geared to said main shaft, and a worm drive from said counter shaft to each screw.

In testimony whereof I affix my signature.

WILLIAM JAMES LOVETT.